G. H. BENNETT.
APPARATUS FOR SOLDERING SHEET METAL VESSELS.
APPLICATION FILED NOV. 8, 1916.

1,343,493.

Patented June 15, 1920.
4 SHEETS—SHEET 1.

Witnesses
B. B. Thompson
A. J. Finotti

Inventor
George H. Bennett
by Sturtevant & Mason
attys

G. H. BENNETT.
APPARATUS FOR SOLDERING SHEET METAL VESSELS.
APPLICATION FILED NOV. 8, 1916.

1,343,493.

Patented June 15, 1920.
4 SHEETS—SHEET 2.

G. H. BENNETT.
APPARATUS FOR SOLDERING SHEET METAL VESSELS.
APPLICATION FILED NOV. 8, 1916.
1,343,493.
Patented June 15, 1920.
4 SHEETS—SHEET 3.
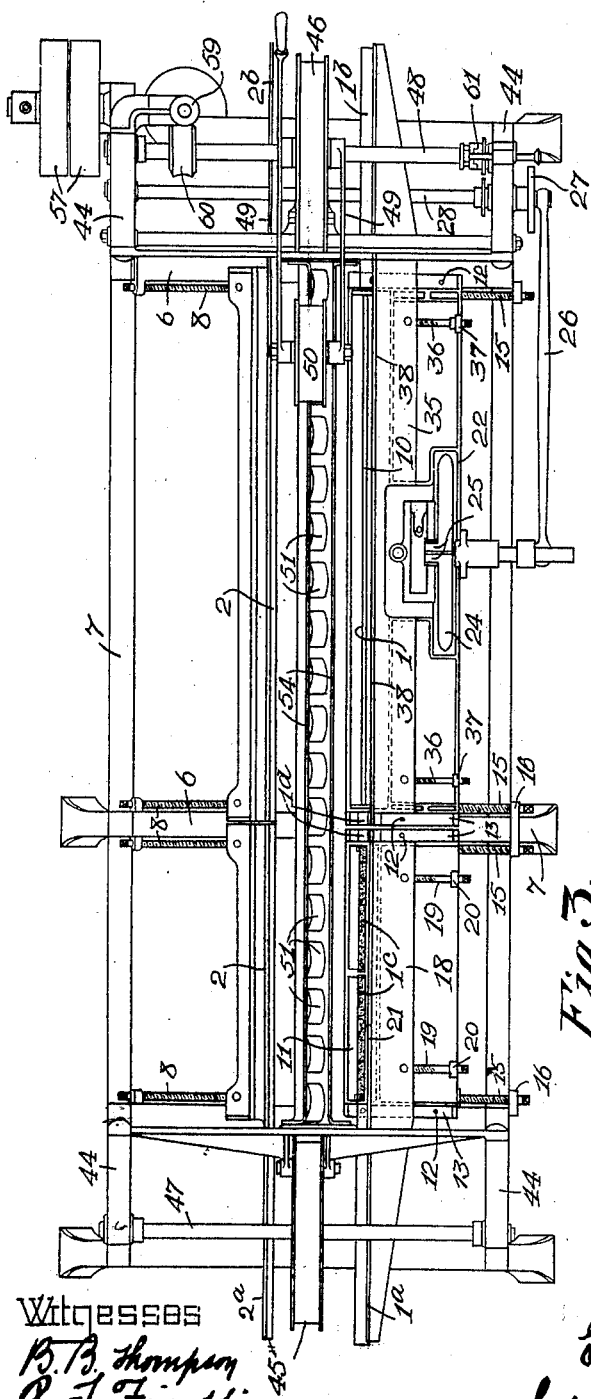
Witnesses
B. B. Thompson
A. J. Finotti
Inventor
George H. Bennett
by Sturtevant & Mason
Attys G. H. BENNETT.
APPARATUS FOR SOLDERING SHEET METAL VESSELS.
APPLICATION FILED NOV. 8, 1916.

1,343,493.

Patented June 15, 1920.
4 SHEETS—SHEET 4.

Witnesses

Inventor
George H. Bennett,
by Sturtevant Mason
attys.

UNITED STATES PATENT OFFICE.

GEORGE H. BENNETT, OF KENDAL, ENGLAND, ASSIGNOR TO GILBERT GILKES & COMPANY, LIMITED, OF KENDAL, ENGLAND.

APPARATUS FOR SOLDERING SHEET-METAL VESSELS.

1,343,493.  Specification of Letters Patent.  Patented June 15, 1920.

Application filed November 8, 1916. Serial No. 130,243.

*To all whom it may concern:*

Be it known that I, GEORGE HERBERT BENNETT, a subject of the King of Great Britain, residing at Kendal, in the county of Westmoreland, in the Kingdom of England, have invented certain new and useful Improvements in Apparatus for Soldering Sheet-Metal Vessels, of which the following is a specification.

This invention has reference to improvements in apparatus for soldering the tops and bottoms of cylindrical or other shaped cans, canisters, boxes and other sheet metal-ware or receptacles, such as cans for containing substances liable to deteriorate on exposure to the air or moisture and for other purposes. These improvements have been designed with the object of rapidly and effectively accomplishing the purpose mentioned in a simple, automatic and economical manner.

The improved soldering machine is of the type in which the sheet metal receptacles which are to be soldered, are rolled or trundled through the machine along a track by means of a traveling carrier, and during such traverse, passed over a fluxing device and then over an appliance containing the soldering metal which is kept in a liquid or melted state by a heating device.

The improvements have been devised with the object among other things of providing a machine which will enable receptacles of practically any length and practically any diameter or transverse width to be operated upon, to enable the end seams of the vessels to be soldered, to regulate the flow of solder at the outlet of the soldering device so as to prevent a too copious flow thereat, and to prevent the bead of solder at the said soldering outlet from pulsating.

According to the present invention the vessels to be soldered are rolled or trundled through the machine on a trackway composed of a pair of longitudinal rails which are adapted to support the ends of the can bodies in a canted position as they are rolled through the machine by the endless traveling carrier. These rails are provided with means for adjusting them in relation to each other and with the carrier, so as to vary their distance apart while allowing the carrier to remain substantially central, and the carrier is also adjustable vertically as regards its distance from the trackway so that practically any desired length or transverse width of receptacle can be passed through the machine. The means of adjustment also enables the cant of the receptacles as they are passed through the machine to be very accurately adjusted, and one of the guide rails or members of the track performs the two fold function of a can body guide, and of flux and solder applying devices. In a known machine of this type, the cans were rolled through the machine upon a table canted to one side, and provided with an adjustable longitudinal plate which formed one side of a channel, the other side of the channel being formed by another adjustable longitudinal plate, and the flux and solder applying devices projected upward through a longitudinal slot in the said channel, so that it was the channel or table which bore the weight of the cans and the traveling carrier above them. By the present improvement however the cans are rolled through the machine upon rails, one of which is made up of the longitudinally disposed brush or pad of the fluxing device also one of the lips of a solder slot and of feed and delivery rails. This arrangement facilitates adjustment for different lengths of can and also enables the cant of the cans as they are passed through the machine to be very accurately adjusted. A further feature is the means for getting rid of or interrupting the dross that is unavoidably formed with solder, and enabling a proper quantity of solder substantially free from dross to come into contact with the parts to be soldered.

The fluxing device is of the type which comprises a bath having a stationary brush, the bristles of which are set at an angle inclined in the direction of the traverse of the vessels, and the soldering device is of the kind already known which comprises a tank in which the solder at a lower level in one compartment is raised by a dipper to a higher level in a second compartment from which the solder is supplied through an upwardly projecting slot or outlet which is flared for the purpose of forming the solder bead. Means are provided for preventing any pulsation of this solder bead such means comprising a tray at the mouth of the high level compartment into which the solder is delivered by the dipper and from whence it flows into the high level compartment through an orifice, a valve being provided for controlling the flow through the said orifice, so that the flow of solder into the said compartment shall be continuous and not pulsatory. Such means are similar to what is described in connection with the side seam soldering machine of my application for patent Serial No. 126,133. Means are also provided for maintaining the solder bead at a uniform size comprising a pipe or passage communicating with the high level compartment, and a ferrule screwed onto the top thereof provided with overflow ports at the sides located in such a position that any overflow of solder escapes through these ports and passes again into the low level compartment before any undue overflow can take place at the solder slot. Such means are also similar to what is described in connection with my side seam soldering machine aforesaid.

The invention will be understood from the following description, reference being had to the accompanying drawings in which:—

Fig. 3 is a plan view of Fig. 1 with the conveyer belt or carrier omitted;

Fig. 4 is a plan view of the soldering apparatus for applying solder to the outside of the seam;

Figure 1:
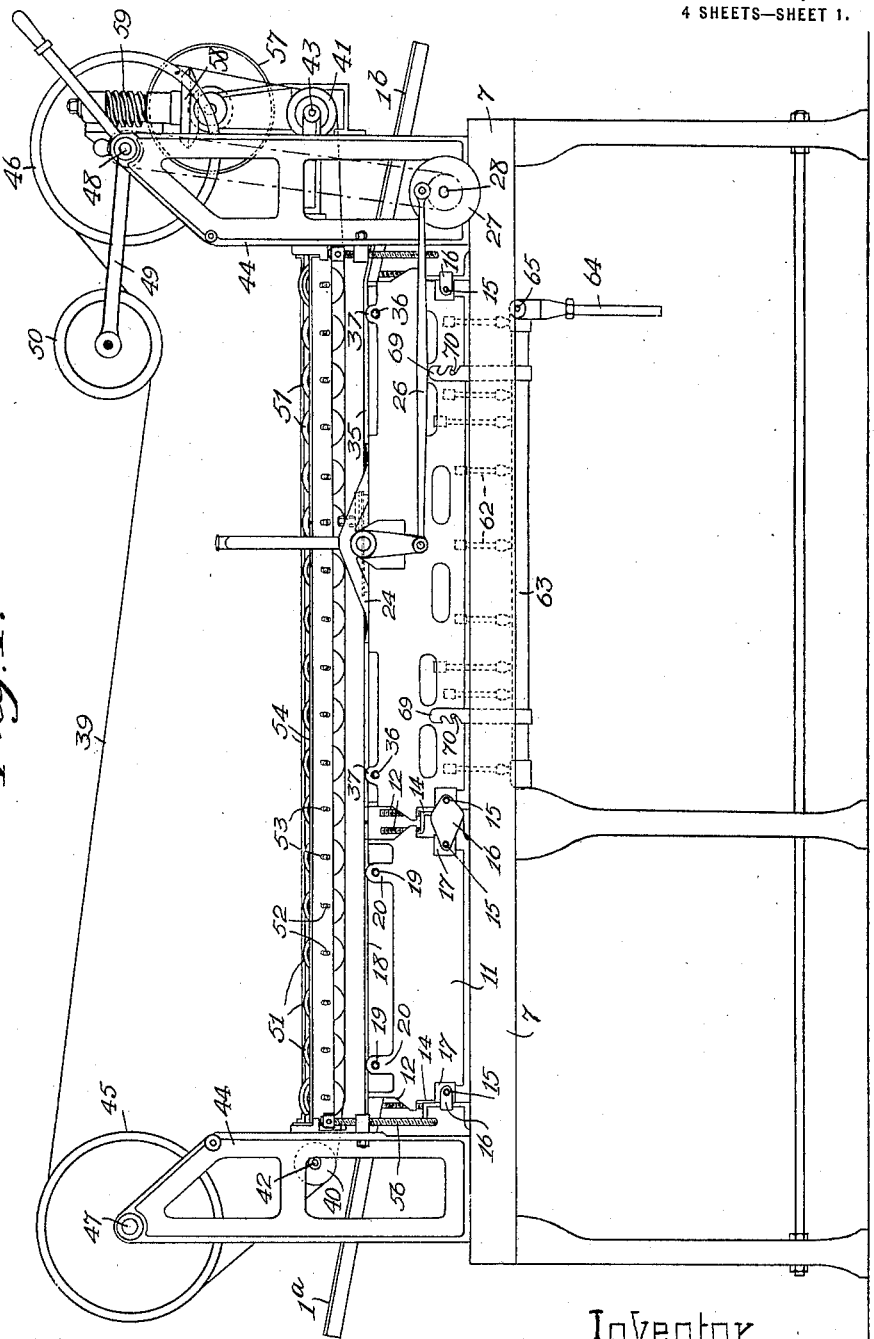
Figure 1 illustrates in side elevation the complete machine.
Figure 2:
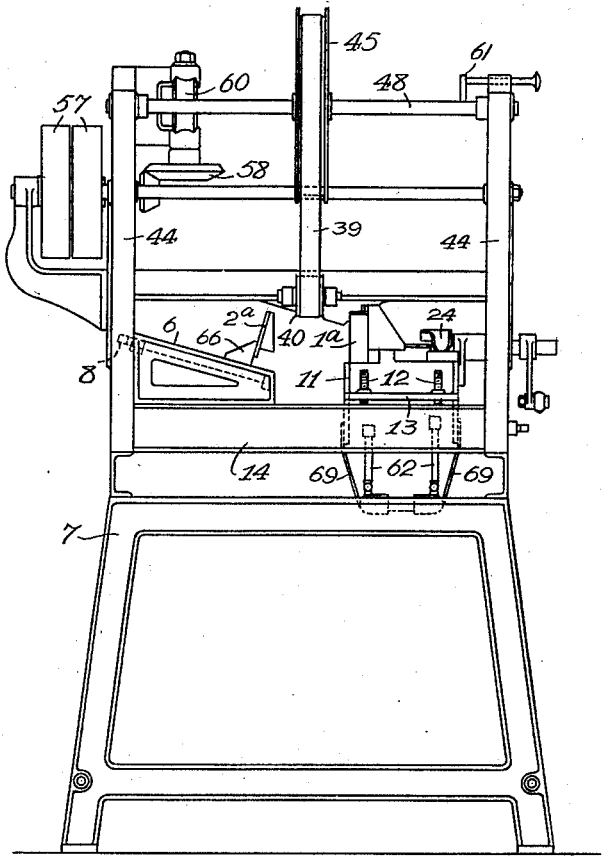
Fig. 2 is an end elevation thereof.
Figures 7, 8:
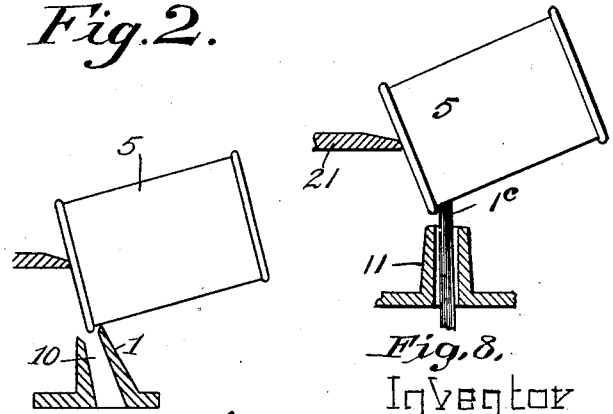
Fig. 7 is a sectional view illustrating the method of getting rid of the dross from the molten solder.

And Fig. 8 a sectional view illustrative of the fluxing brush or pad and the allied parts.

The sheet metal tops or bottoms having been placed in position on the can bodies and crimped or otherwise secured thereto, the vessels are fed through the machine so as to solder the said tops or bottoms (or both) to the body parts. In order to traverse the vessels through the machine they are placed upon longitudinal extending guide bars or rails which support the ends of the vessels and a carrier is provided which by contact with the vessels causes them to be rolled or trundled through the machine and during such traverse one end is passed over a fluxing device and then over a soldering device. There are two of these longitudinal guide bars or rails running parallel with each other, with the carrier located centrally above, namely, a back guide bar 2 and a front one 1, and they guide the seams at one end of the receptacles into contact with the fluxing and soldering devices. These two guide bars are each inclined at the feed and delivery ends, while intermediate thereof they may be substantially horizontal and these two guide bars 1 and 2 form tracks or runways of such a gage that the receptacles at the two ends roll thereon. Means are provided for adjusting these guide bars to vary their distance apart, while maintaining the centralization of the carrier. This enables the guide bars to be set for any desired length of cans and enables the carrier to always remain mid-way between the two ends of the cans.

The back guide bar 2 consists of a longitudinal upstanding member having a forwardly projecting channeled rib piece 4 integral therewith. The rib forms a track or runway for one end of the vessel or receptacle to roll on, and the upstanding member 2 forms a side wall for the can end to limit or prevent endwise movement of the cans 5. This back guide bar is supported on transverse framings 6 spaced apart and affixed to the main frame 7 of the machine, the framings 6 having an inclined upper surface of suitable length, so that the back guide bar 2 is canted somewhat, and the said back guide bar is adjustable by screwed spindles 8 Fig. 3 journaled in the framings, and passing through threaded nuts secured to the back guide bar so that by turning these spindles 8 the back guide bar 2 can be moved toward or away from the center line of the machine, along which the carrier (hereinafter referred to) travels. The transverse framings 6 are made of such lengths as to allow for such adjustment as may be required. For instance the back guide bar 2 could be moved to within one inch or less from the center line of the machine, or moved back 6 inches or more therefrom. The said back guide bar 2 is set at a somewhat higher level than the front guide bar 1 so that the receptacles 5 occupy a sloping position as they are rolled through the machine and the most suitable cant or slope may be obtained by adjusting the back rail relative to the framings 6. This may be effected by making the part 66 which carries the threaded nuts (through which the spindles 8 are threaded), separate from the back rail member 2 to which it is secured by bolts passing through the slots 67, so that by slackening the nuts 68 the height of the back rail above the front rail can be adjusted to a nicety. This back guide bar has an inclined feed rail $2^a$ at one end, and an inclined delivery rail $2^b$ at the other end.

The front guide bar 1 is a composite one, that is it consists at the ends, of an inclined feed rail $1^a$ and an inclined delivery rail $1^b$ comprising (as in the case of the back rail) an upstanding member having a projecting rib piece which forms the track. Intermediate between these so as to form a continuation thereof is a longitudinal brush, pad or the like 1ᶜ which supplies a suitable flux to the edges to be soldered together; a solder outlet or slot 10 formed of two lips, one of which constitutes the track or runway 1 for the end of the vessel to roll on after it has passed the fluxing brush; and a short rail 1ᵈ which bridges over the gap between the fluxing brush 1ᶜ and the solder slot 10. Thus the front guide bar which supports one end of the receptacles as they are rolled through the machine, is made up of the fluxing brush or pad 1ᶜ, also of the lip 1 of the longitudinal solder slot 10, the inclined feed and delivery rails 1ᵃ and 1ᵇ, and the bridge rail 1ᵈ. In connection with the fluxing brush 1ᶜ and the solder slot 10, guide rails such as 21 and 35 are provided which form rests for one end of the cans, as they are trundled along the brush 1ᶜ and lip 1.

The fluxing appliance comprises a tank or bath 11 communicating with a longitudinally stationary brush, pad or the like 1ᶜ, the said bristles, pad, &c., being set at an angle inclined in the same direction as the travel of the cans or receptacles, and the action of the said brush 1ᶜ is two-fold, firstly to form a part of the front guide bar, and secondly to wipe the fluxing liquid which rises up the bristles by capillary attraction from the tank 11 on to the parts to be soldered. The tank 11 is supported and rendered adjustable as to height, by screwed pins 12 passed vertically through screwed holes in flanges 13 cast integrally on the tank 11 and bearing on shelf pieces 14 which consist of cross girders affixed to the framework 7. The said tank together with its brush 1ᶜ, is adjustable laterally by screwed spindles 15 journaled in members 16 affixed to the cross girders 14 and passing through nuts 17 which are so mounted in slots in the ends of the tank as to permit the tank being freely adjusted vertically by the screwed pins 12, and cause the tank to be adjusted laterally by the spindles 15. By means of the screwed pins 12 the fluxing device can be raised or lowered to regulate to a very fine degree the amount of fluxing liquid to be applied, also take up wear of the bristles, and raise or lower the fluxing brush portion of the front rail relatively to the back rail, thus providing a supplementary means of giving any desired tilt to the receptacles as they are trundled through the machine; and by means of the screwed spindles 15 the fluxing tank together with its brush 1ᶜ can be moved laterally so as to be moved toward or away from the center line of the machine along which the carrier travels. In my preferred arrangement the inclined feed rail 1ᵃ is provided with an extension or supplementary rail 18 made integral therewith, and the said rail 1ᵃ is supported in position by mounting this extension on or in connection with the flux tank 11. This arrangement insures that any vertical adjustment of the flux tank by the screwed pins 12 will adjust vertically the inclined feed rail 1ᵃ likewise. The said inclined feed rail 1ᵃ is however adjustable laterally independent of the flux-tank by screwed spindles 19 journaled in lugs 20 cast on the flux tank 11, and passed through nuts secured to the extension bar 18. The said extension bar is offset at one edge 21 to clear the fluxing brush 1ᶜ so as to enable the latter to be placed in exact alinement with the inclined feed rail 1ᵃ. This off-set edge 21 also serves the important purpose of forming a rest for one end of the cans, thus keeping them in position on the brush, as they are trundled through the machine. This rest 21 is substantially a continuation of the rest 38 (hereafter referred to), the latter being clearly shown in Fig. 5. Endwise movement of the receptacles is limited or prevented by this rest.

Immediately beyond the fluxing brush 1ᶜ, is the longitudinal solder slot or fountain 10, its action being also two fold, namely to form a part 1 of the front guide bar and to apply molten solder to the parts to be soldered. This solder slot 10 is in communication with a solder tank. The type of solder tank I prefer to use is one which is compartmented, consisting of what I term a main or low level compartment 22 and a high level compartment 23, and the solder is raised mechanically from the main compartment 22 to the higher level of the second compartment 23 by means of a rocking cradle or dipper 24 the said cradle dipping into the solder at each oscillation and feeding the solder therefrom to the receiving mouth of the higher level compartment 23 by way of the discharge openings 25 in the cradle all in a manner which is already known in soldering machines. The said high level compartment 23 communicates with the solder outlet or slot 10 which, as already stated is formed of two lips projecting upward and arranged with such a space between them that a proper quantity of solder may pass through the said space. The inner lip 1 of the two lips forms a part of the front rail upon which the receptacles turn, while the outer lip is spaced from the inner lip 1 rather farther than is required (say one quarter of an inch) to meet the joints to be soldered so as to allow for a free flow of solder, and this outer lip is flared and located at a slightly lower level than the inner lip. The object is to allow for a free flow of solder to reach and come into contact with the joints of the receptacle and permit of the dross that is unavoidably formed with solder (also any surplus solder) to overflow the outer lip and pass again into the low level compartment by gravitation. The higher level compartment 23 is immersed in the solder in the main tank excepting at the receiving mouth and at the lips, and the solder in the tank is maintained in a molten state by means of gas burners which will be described presently. The cradle 24 is oscillated by means of a connecting rod 26 from a crank disk 27 which is driven from a shaft 28. The action of the rocking cradle or dipper 24 being intermittent, the delivery of the solder through the discharge openings 25 is in jerks, and this is liable to cause the bead of solder at the solder slot 10 to pulsate. In order to prevent this a tray 29 is provided at the receiving mouth of the high level compartment 23 into which the solder is delivered by the dipper 24 and from whence it flows into the high level compartment 23 through an orifice 30 controlled and regulated by a valve 31. This valve is so regulated that so long as the apparatus is at work there is always some solder left in the tray 29 even during the intervals when solder is not flowing out through the discharge openings 25 and therefore the flow of solder into the high level compartment 23 is rendered continuous and not pulsatory. The valve is readily adjusted by screwing the valve up or down which is readily done by a screw driver or key, thus allowing the flow of solder to be regulated so that the tray does not become empty so long as the machine is at work. The high level compartment 23 also communicates with a pipe or passage 32 upon the top of which is screwed a ferrule 33 provided with overflow ports 34 at the sides. The solder besides rising up through the solder slot 10, also rises up through the pipe 32 and any overflow of solder escapes through the ports 34 and passes again into the low level compartment 22. This prevents any undue overflow of solder taking place at the solder slot 10, and it constitutes an automatic arrangement for maintaining the solder bead at a uniform size, and preventing a too copious flow of solder through the slot 10. By turning the ferrule, the height of the ports 34 can be regulated to a nicety, so that the overflow shall take place through the ports before it can take place at the solder slot. The soldering apparatus is supported and rendered adjustable vertically and laterally in a similar manner to the fluxing tank 11 and the reference numerals used in connection with the adjusting devices for the flux tank, are used to indicate corresponding parts in connection with the solder tank.

Figure 5:
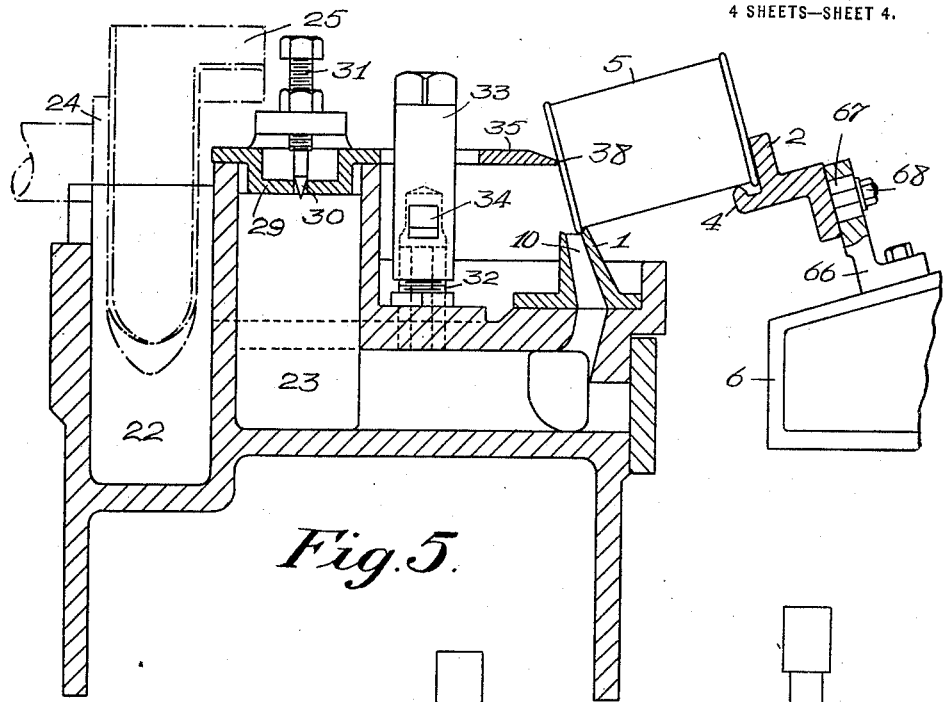
Fig. 5 is a cross section thereof.
Figure 6:
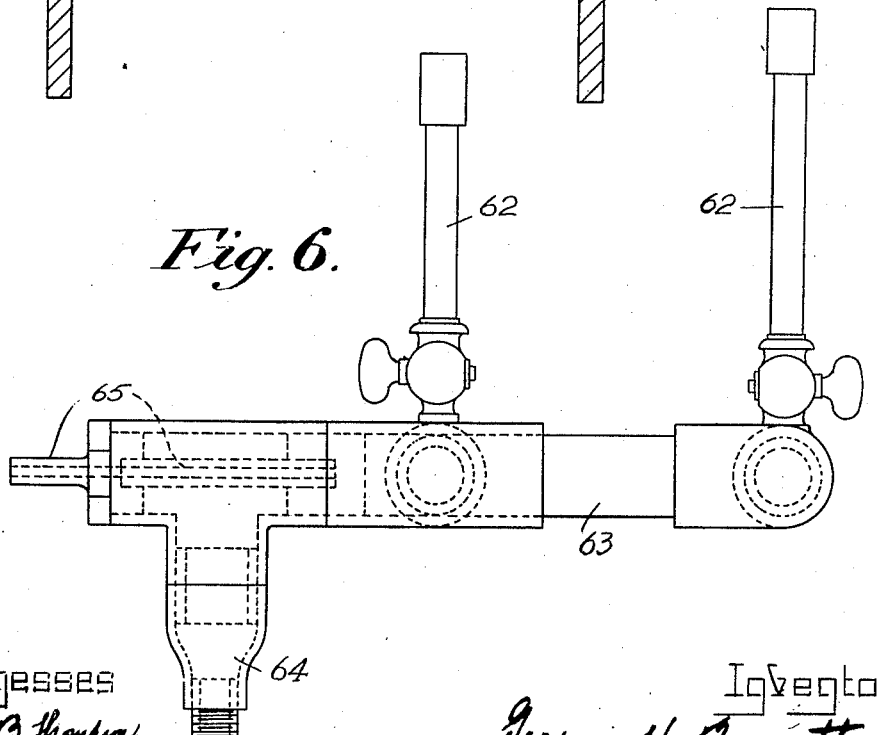
Fig. 6 is an end view of the heating apparatus for maintaining the solder in a molten state in the solder tank.

The inclined delivery rail $1^b$ is provided with an extension or supplementary rail 35 made integral therewith, and the said rail $1^b$ is supported in position by mounting this extension on or in connection with the solder tank 22. This arrangement insures that any vertical adjustment of the solder tank by the screwed pins 12 will adjust vertically the inclined delivery rail $1^b$ likewise. The said inclined delivery rail $1^b$ is adjustable laterally in a similar manner to the feed rail $1^a$ by screwed spindles 36 journaled in lugs 37 cast on the solder tank 22 and passed through nuts secured to the extension bar 35. This extension bar is likewise offset at one edge 38 to clear the solder slot 10. The said off-set edge 38 (the position of which is shown in Fig. 5) serves the purpose of forming a rest which is a continuation of the offset edge or rest 21 to keep the end of the can in position on the lip 1 and prevent endwise movement of the receptacles as they are trundled along the lip.

It will be seen that the can body near the end rolls on the lip 1, and that the can end rests against the edge 38, the seam being located between, so that it rides through the bead of solder and picks up the desired quantity.

The portion of the front guide bar which bridges the gap between the fluxing brush and the solder slot is formed by a short rail $1^d$ which is an extension of the compartment or slot that holds the fluxing brush and a similar short rail which is an extension of the lip 1 of the solder slot, the meeting ends of these two extensions being in alinement.

It will now be understood that the back guide bar 2, $2^a$, $2^b$, and the front guide bar 1, $1^a$, $1^b$, $1^c$, $1^d$ can be adjusted toward or away from the center line of the machine along which the carrier travels, thus rendering the guide bars or track adjustable in gage for the particular length of the receptacles to be operated upon, the carrier always remaining midway (or centralized) between the ends of the receptacles which are being passed through the machine. Hence the front and back guide bars can be spaced 1½ inches apart, or as much as 12 inches or more apart so that receptacles of practically any required length can be soldered by the machine.

In Fig. 7 is shown in a somewhat exaggerated way, the solder slot 10 with the outer lip flared, and located at a lower level than the inner lip 1, so that the solder gently overflows the lower lip sufficiently to carry away most of the dross that is unavoidably formed. This however does not prevent the solder at the higher lip 1 along which the cans are rolled, from finding its way by capillary attraction between the cans and the lip 1, thus soldering the joint. The cans are as already described kept clear of the lower lip by the rest 38, so that plenty of space is allowed for the dross to overflow. By setting the tin at a correct angle by the adjusting screws, no solder touches the end of the cans, but is applied only around the joint where the can makes contact with the lip 1, the principle of capillary attraction being taken advantage of in this appliance. The amount of flux imparted to the narrow surface of solder bead by the tins passing over it, is sufficient to keep the bead perfectly bright and clear, and by the tins passing over in quick succession the solder bead is maintained in this state.

The receptacles are fed onto the inclined feeding ends 1ª and 2ª of the rails, and as they run down them they come into contact with the under face of a carrier. This may consist of an endless conveyer 39 which is guided or positioned at the requisite distance from the guide rails by guide pulleys 40 and 41 whose spindles 42, 43 are journaled in upright members 44 supported by the main frame 7. The carrier 39 also passes over an upper pair of guide pulleys 45, 46 which are affixed to a pair of shafts 47, 48 journaled in the upright members 44. For the purpose of maintaining the carrier 39 at the requisite tension, the usual radial arm 49 fulcrumed on the shaft 48 is provided, with a jockey pulley 50 bearing upon the upper length of the carrier 39. For the purpose also of canting that portion of the carrier which contacts with the receptacles (in the interval between the guide pulleys 40 and 41) the usual roller weights 51 bear against the lower length of the carrier, the said roller weights which are provided with trunnions 52 bearing in vertical slots 53 in the longitudinal bars 54, being spaced apart. These roller weights press the moving carrier into contact with the receptacles and roll or trundle them forward through the machine thus preventing the cans from sliding rather than rolling. The longitudinal bars 54 are supported at the ends on the upright members 44 by means of screwed adjusting spindles 56, the purpose of which is not only to vary the cant of the roller weights, but also enable the spacing of the contacting portion of the lower run of the carrier from the guide bars to be varied, so as to provide for many different diameters of receptacles to be soldered, the jockey pulley 50 taking up or paying out the slack according to the diameter of the receptacles which are fed through the machine. Thus the machine may in fact be adjusted to solder receptacles varying from one inch to as much as eight inches in diameter. The guide rollers 40 and 41 may also be arranged to be adjustable if desired.

It will now be understood that in addition to the machine being adjusted to suit receptacles of any desired length, it can also be adjusted, to suit receptacles of any desired diameter or transverse width.

All the moving parts of the machine are connected by suitable gearing so as to be driven by a single prime mover, and all the elements whose movements have to be timed and proportioned one to the other, are connected together and caused to act in harmony. A belt pulley 57 operates through a bevel gear 58 and a worm 59 and worm wheel 60 the shaft 48 upon which the carrier pulley 46 is secured, and this shaft rotates by means of chain gear the countershaft 28 which by means of the connecting rod 26 oscillates the cradle which raises the solder from the low level solder compartment to the receiving mouth of the high level one, from whence it is fed to the solder slot or lips. The chain wheel or countershaft 48 is provided with a clutch device 61, so that the cradle 24 can be thrown out of gear when it is desired to set the machine for any given size of receptacle and before the solder has been put into a molten condition. This enables receptacles to be run through the machine for testing purposes without the cradles working at all.

The solder is kept in a melted condition by gas burners 62 which are preferably supplied with air. A convenient arrangement is to provide a gas ring 63 of rectangular or any other suitable shape with a dozen burners or so supplied by a single gas inlet 64, and projecting at right angles to the gas inlet into this ring, is an air nozzle 65. The gas issuing into the space surrounding the air nozzle induces a current of air to enter through the said nozzle at high velocity and mingle with it. A cock is provided to shut off this air jet when not required, and the ordinary regulatable orifices in the gas pipe through which air is drawn to unite with the gas, like those of a Bunsen burner, can then be opened to admit a natural air draft. These burners are hung from the solder tank by the hangers 69 engaging studs 70 projecting from the said tank 22, and any movement of tank by way of adjustment moves the burners also. This saves any independent adjustment of the burners.

The mode of operation may be briefly summarized as follows:—

The solder required for use is placed in the solder tank 22 and the fluxing liquid in the fluxing tank 11, and when the carrier 39 and the guide bars have been adjusted to receive the receptacles of the diameter and length required the solder is reduced to a molten state by means of the gas jets 62. On power being applied to the machine, the cradle 24 is set into oscillation, and the carrier 39 is caused to move longitudinally. The receptacles having the tops and (or) bottoms crimped on, are fed on to the guide bars at one end of the machine and coming into contact with the under-face of the carrier 39 are taken along under the rollers, which assist the action of rolling or trundling the receptacle along the trackway. As the said receptacles are rolled along, the joint which is to be soldered, comes into contact with the fluxing brush 1° and thereby has the fluxing liquid wiped on to it, and with the continued rolling of the receptacles causes the joint to be soldered to pass over the solder slot 10 through which issues the molten solder, so that the solder is forced into contact with the parts to be soldered. The soldering slot also acts to apply the necessary pressure to the parts being soldered, and produces a very neat and secure joint. The receptacles after leaving the solder slot roll down the discharge rails, after which they may be reversed and passed through the machine a second time to solder the bottoms to the body parts, or if desired a second machine may be used placed in alinement with the first one, but arranged the reverse way or in such manner that the receptacles will be tilted in the opposite direction, so that the soldered ends will now be at a higher level, while the unsoldered ends will be at the lower level, and will undergo the fluxing and soldering operations as previously described. The receptacles with the ends completely and perfectly soldered in position are passed off the guide bars and delivered to any convenient place or removed by an attendant. The soldering of the receptacles goes on with little or no interruption so that such receptacles neatly and perfectly soldered are delivered in quick succession, and the arrangements described for adjustment enable the machine to operate upon receptacles of any desired dimensions. Endwise movement of the receptacles at the feed and delivery ends of the trackway is limited or prevented by the upstanding member of the rails, and at the intermediate part between these ends by the upstanding member of the back rail and the rests or off set parts 21 and 38.

I claim as my invention:—

1. In an apparatus for soldering the ends of sheet metal receptacles, a solder tank, a solder slot or fountain in connection therewith composed of two lips between which the solder flows to the edges to be soldered, one of the said lips being higher than the other forming a guide rail for one end of the cans to roll on, a flux tank, a brush or pad in connection therewith for applying a flux to the edges to be soldered, said brush or pad also constituting a guide rail for one end of the cans to roll on, a guide rail at a higher level to support the other end of the can, guide rails located in alinement with the said brush or pad and the said lip and with the higher guide rail to form feed rails at one end of the apparatus and delivery rails at the other, and adjustable rests arranged in connection with the fluxing brush or pad and the solder slot to prevent endwise movement of the transversely disposed and canted cans.

2. In an apparatus for soldering the ends of sheet metal receptacles, a solder tank, a solder slot or fountain in connection therewith, composed of two lips between which the solder flows to the edges to be soldered, one of the said lips forming a rail upon which the cans at one end roll thereby forming a capillary space between the cans and the rail as they are traversed through the machine, and the other lip spaced a distance from the first one and having its upper edge located at a lower level than the first lip whereby solder overflows this lower lip sufficiently to carry away a considerable part of the dross, the solder at the other side of the slot finding its way by capillary attraction to the part of the can to be soldered.

3. In an apparatus for soldering the ends of sheet metal receptacles, a solder tank, a solder slot or fountain in connection therewith composed of two lips between which the solder flows to the seam to be soldered, one of the said lips forming a rail upon which the cans at one end roll as they are traversed through the machine, and the other arranged with its upper edge at a lower level to allow for the overflow of dross and a guide rail for the end of the receptacles to bear against as they rolled through the machine along the higher lip so that the end seam of the receptacles is kept clear of the lower lip to give space for the dross to overflow.

4. In an apparatus for soldering the ends of sheet metal receptacles, a trackway composed of guide bars or members arranged in parallelism and in such manner as to support the cans in a canted position, a solder tank having two lips from between which the solder is delivered, one of which forms a portion of one of the rails of the trackway, a traveling carrier for advancing the cans along the trackway, a rail so mounted on the said solder tank as to form an extension of the said lip at the delivery end of the machine, and screws for adjusting the solder tank together with the said extension relatively to the carrier and to the other rail of the trackway.

5. In an apparatus for soldering the ends of sheet metal receptacles, a solder tank, a solder slot in connection therewith, a flux tank, a fluxing brush or pad in connection therewith, a traveling carrier adapted to roll the can bodies through the machine, a longitudinal guide rail supported at one side of the carrier upon the upper surface of transverse frames, to form one member of the trackway, a longitudinal guide rail at the other side of the carrier and at a lower level part of which guide rail is made up of the fluxing brush or pad and one of the lips of the solder slot, to form the other member of the trackway and means for adjusting the said rails both vertically and laterally, whereby any desired length or transverse width of receptacles can be passed through the machine or the cant of the can bodies varied.

6. In an apparatus for soldering the ends of sheet metal receptacles of the type specified, a solder tank, a solder slot in connection therewith, one lip of the solder slot forming a support for one end of the cans as they are rolled through the machine while the other lip is spaced at such a distance from the first one and located at a lower level that part of the solder overflows this lower lip sufficiently to carry away a considerable part of the dross, the solder at the other side of the slot finding its way by capillary attraction to the part of the can to be soldered.

7. In an apparatus for soldering the ends of sheet metal receptacles a solder tank, a solder slot in connection therewith having a high and a low lip a guide rail in connection with the solder slot for the end of the receptacle to bear against as it is rolled or trundled along the higher lip of the said slot so that the end seam of the receptacle is kept clear of the lower lip and gives plenty of space for the dross to overflow, whereby no solder can touch the receptacles at the part where the can makes contact with the higher lip.

8. In an apparatus for soldering the ends of metallic cans of the type specified, a solder tank having two lips from which the solder is delivered one of which forms a portion of one of the rails of the trackway, a traveling carrier for advancing the cans along the trackway, a rail so mounted on the said solder tank as to form a continuation of the said solder lip at the delivery end of the machine, and screws for adjusting the solder tank together with the said rail relatively to the carrier and to the other rail of the trackway.

9. In an apparatus of the type referred to for soldering the ends of metallic cans, a flux tank having a fluxing brush or pad which forms a portion of one of the rails of the trackway, a traveling carrier for advancing the cans along the trackway, a rail so mounted on the flux tank as to form a continuation of the said fluxing brush or pad at the feed end of the machine, and means for adjusting the fluxing tank together with the said rail relatively to the carrier and to the other rail of the trackway.

10. In an apparatus for soldering the ends of metallic receptacles, the combination with a trackway on which the cans are supported and carried, a solder slot adapted to supply solder to the end seams of the cans from a solder tank having low and high level compartments, of means for maintaining the solder bead at a uniform size, such means comprising a pipe or passage communicating with the high level compartment and a ferrule screwed on to the top thereof, provided with overflow ports at the sides located in such a position that any overflow of solder escapes through these ports and passes again into the low level compartment before any undue overflow can take place at the solder slot.

In witness whereof I have hereunto signed my name this 4th day of October, 1916, in the presence of two subscribing witnesses.

GEO. H. BENNETT.

Witnesses:
G. C. DYMOND,
JOHN J. LEARY.